Sept. 15, 1959     H. S. CAMPBELL     2,904,369
POWER OPERATED SLING RELEASE CONSTRUCTION
Filed May 6, 1955     3 Sheets-Sheet 1
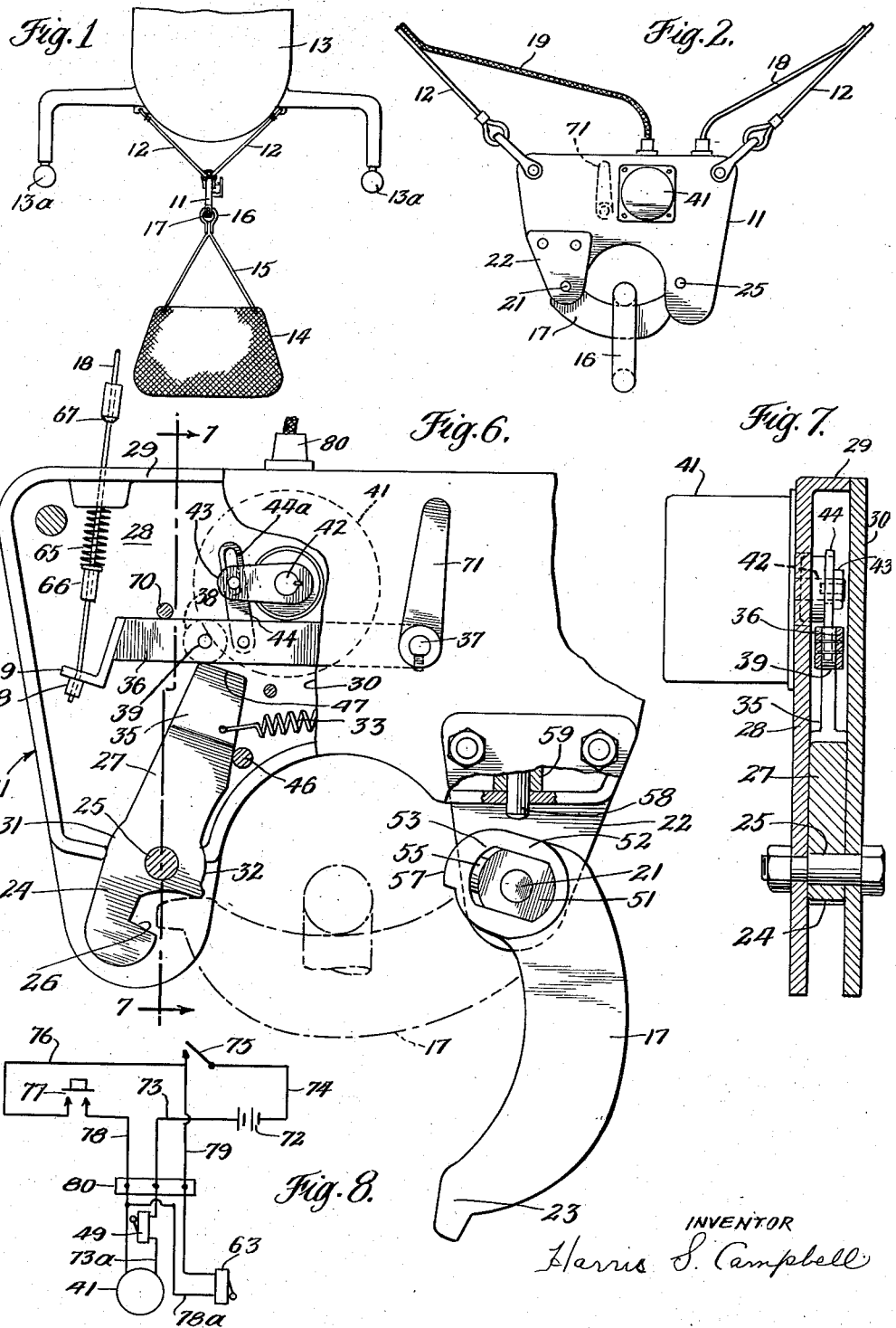
INVENTOR
Harris S. Campbell

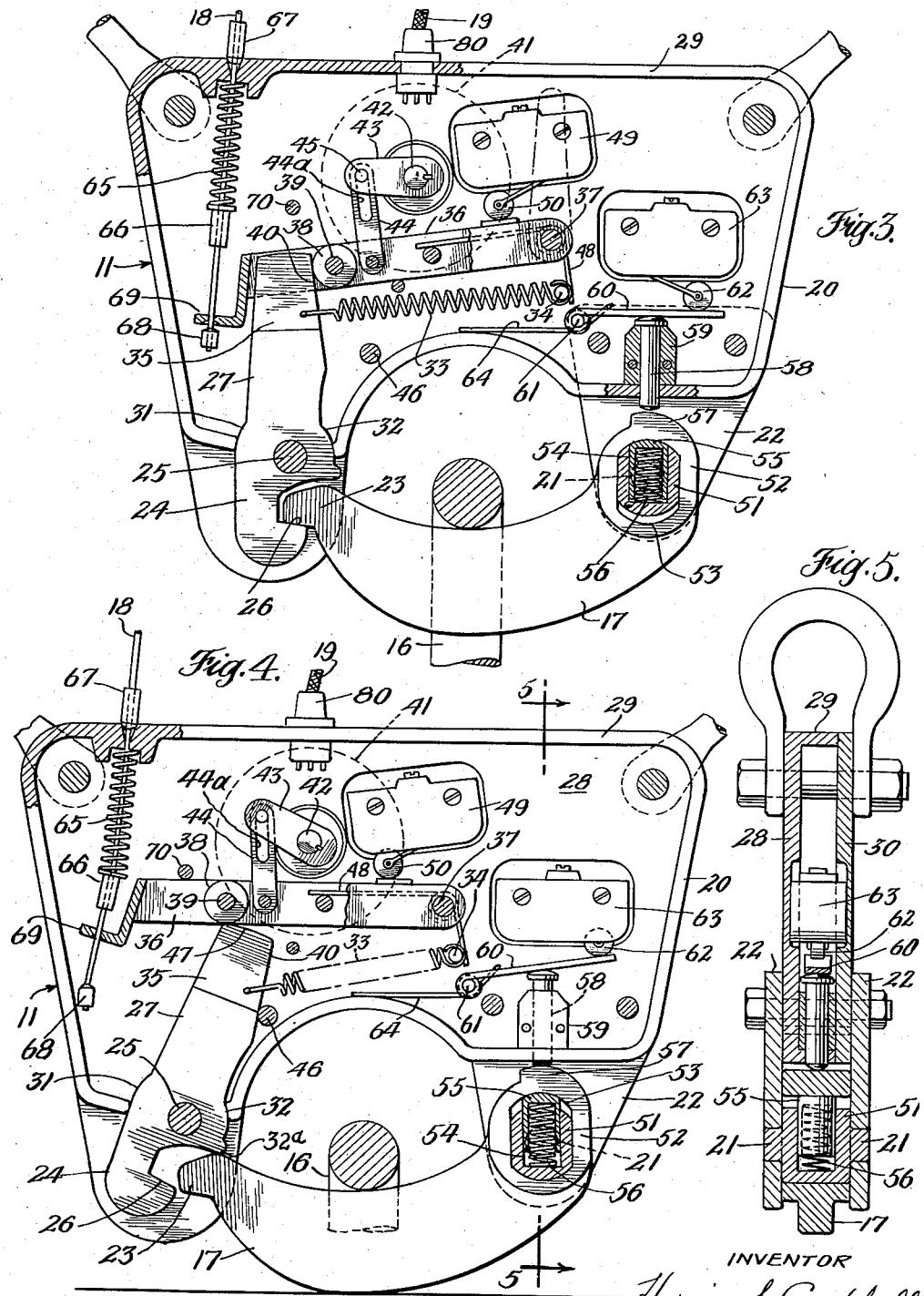

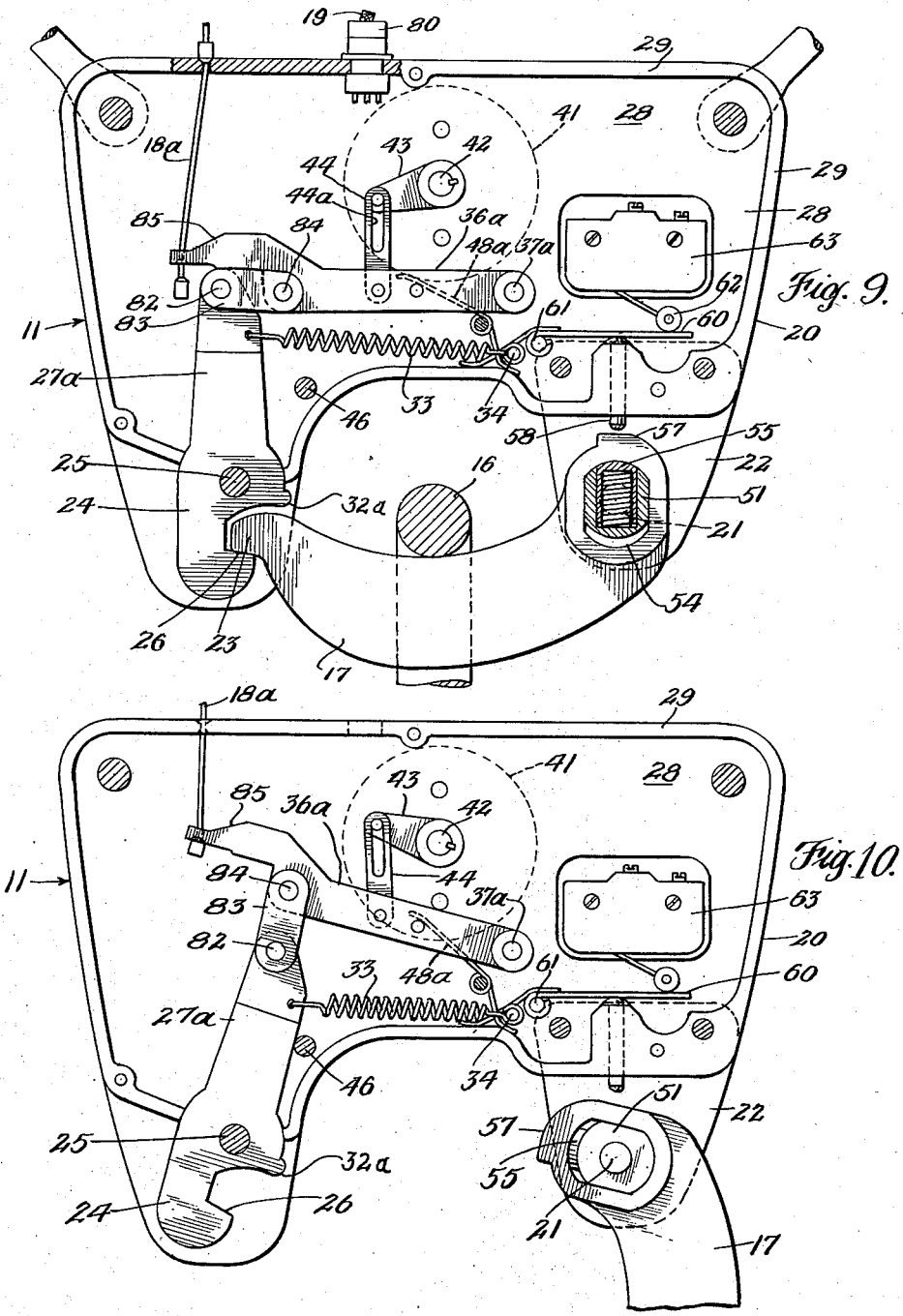

United States Patent Office 2,904,369
Patented Sept. 15, 1959

2,904,369
POWER OPERATED SLING RELEASE CONSTRUCTION

Harris S. Campbell, Bryn Athyn, Pa., assignor to Eastern Rotorcraft Corporation, Doylestown, Pa., a corporation of Pennsylvania Application May 6, 1955, Serial No. 506,526
14 Claims. (Cl. 294—83)

This invention relates to sling release hooks and is more particularly concerned with release hooks incorporating electric and automatic releasing mechanism.

Under many circumstances a sling release should be capable of being instantaneously released by the operator with a minimum of effort when the load is exactly in proper position for depositing. This is particularly true in connection with a cargo hook supported under a helicopter and which must be operated by the pilot when the aircraft is brought into proper position for relinquishing the load while the helicopter is hovering. Under such operating conditions the pilot must also maintain full and accurate control of the position of the helicopter so that it is essential that the cargo hook should be released without the need for moving a hand or foot from the controls.

In addition, in a sling hook of the type under consideration in the present invention, it is desirable to provide for automatic release of the load when the load is deposited on the ground or delivery platform. This automatic release feature is of particular value when operating under conditions where visibility is restricted such as during night operation.

It is an object of the present invention to provide a release hook having a simple mechanism which includes in addition to the manual cable release, an electric release having simplified construction to trip the mechanism.

Another object of the invention is the provision of a main latch and a secondary latch engaging structure which provides for greatly reduced operating loads on the secondary mechanism in order to reduce the size of the electric solenoid required for actuation.

A further object of the invention is the provision of a latch member relationship and interconnecting linkage adapted for actuation by a rotary type solenoid.

A further object of the invention is the provision of a hook structure in which most of the mechanism is enclosed within a weather-proof casing to protect the mechanism against damage and from dirt and moisture.

A still further object of the invention is the provision of a beam part mounted to transmit a portion of the cargo load and which mounting is movable with respect to the frame structure to provide for automatic actuation of a switch when the weight is removed from the hook.

Another object of the invention is the provision of a cargo hook having its mechanism supported in position in one portion of the housing while another portion of the housing may be removed without disturbing the relationship of the operating parts.

Another objection includes the provision of a latch arrangement for supporting one end of the load beam, the other end of the latch extending into the housing and incorporating structure for the transfer of the latch loads to the secondary mechanism. Means for retaining the secondary mechanism in unlatched position when the load beam is in open position is also included.

A further object is the provision of lost motion in the mechanism for both the manual operating connection and the electric operating connection whereby the mechanism may be operated manually without moving the electrical actuating means and vice versa.

How the foregoing and other objects of this invention are attained will be clear from the following description of the drawing in which—

Figure 1 is a somewhat diagrammatic view showing the release hook supporting a load under a helicopter.

Figure 2 is a view to an enlarged scale showing the cargo release hook with its supporting and operating connections.

Figure 3 is a view to a further enlarged scale of the helicopter hook mechanism, the cover having been removed to show the interior mechanism.

Figure 4 is a view similar to Figure 3 but showing the parts moved to electric release position.

Figure 5 is a sectional view taken in the direction of arrows 5—5, Figure 4, through the automatic release mechanism.

Figure 6 is a view somewhat similar to Figure 3 showing the parts moved to release position by the manual release mechanism.

Figure 7 is a sectional view taken along the line 7—7, Figure 6, showing the latch release.

Figure 8 is an electrical wiring diagram to illustrate the electrical operation of the release hook.

Figures 9 and 10 show an alternative form of latch engaging mechanism in the closed and open positions respectively.

Referring to the figures, it will be seen that Figures 1 and 2 show a cargo release hook 11 supported by means of cables 12 which in turn are connected to suitable structure of the helicopter whose fuselage is shown at 13 and whose landing skids are illustrated at 13a. A cargo load 14 is shown suspended by sling 15 from the cargo hook 11. The sling 15 incorporates a ring 16 for transferring the weight to load beam 17 of the cargo hook 11. Extending from release hook 11 is manual release member 18 which may be carried along cable 12 to a suitable lever in the helicopter cockpit. Also electric cable 19 is carried to the fuselage for connection to the battery and pilot's control switch.

The details of construction of hook unit 11 will be more clearly seen in Figure 3 to 7. Figure 3 shows the cover removed from the release unit to disclose the internal mechanism. In this figure the mechanism is in the load carrying position with beam 17 supported in body 20 by means of trunnions 21 supported in lugs 22. The other end of beam 17 has a specially shaped extension 23 adapted to engage latch member 24 for support. Latch member 24 is connected to body 20 by means of pivot 25 and includes a portion having ledge 26 which engages terminal 23 of beam 17. Upper extension 27 of latch 24 projects into the interior of body 20. It will be noted that body 20 includes back plate 28, edge wall 29 which extends almost completely around the body 20 and cover plate 30 (see Figure 5). Latch part 24 incorporates arc portions 31 and 32 which engage edge member 29 of body unit 20. An effective seal for the interior of the body is thus provided while permitting limited swinging movement of latch member 24 about its pivot. A spring 33 is attached near the upper end of latch 24 to urge it into open position. The opposite end of spring 33 is attached to pin 34 carried by body or frame 20.

The upper end of latch 24 is reduced in thickness as indicated at 35 in order to allow it to fit between the side plates of the control beam 36. The control beam is supported at one end by shaft 37 and in turn supports a contacting part in the form of roller 38 in position on pivot or axle 39 supported by the side plates of control beam 36. In the position shown in Figure 3 beam member 36 is in engaged or holding position in which roller 38 reacts against surface 40 of latch 24. In this position beam 36 prevents movement of latch 24 so that it provides support for end 23 of beam 17.

In order to provide opening of the release hook under electrical control, a rotary solenoid unit 41 is mounted on the outside of body plate 28 with its shaft 42 projecting through into the inside of body 20. A rotary type solenoid gives a compact, easily mounted power unit. By ball and cam mechanism a short powerful axial stroke can be transformed efficiently and directly into the desired amount of operational movement by an arm attached to the solenoid shaft. Such solenoids are available commercially in various capacities. The detail construction of the solenoid per se forms no part of the present invention. An example of the basic construction is illustrated in Patent 2,430,940. An arm 43 which is securely attached to solenoid shaft 42 is connected to link 44 by means of pin 45. Link 44 is pivotally attached at its lower end to control beam 36. Slot 44a is provided in the upper portion of link 44 so that beam 36 may be moved manually without disturbing the position of solenoid arm 43.

In Figure 4 control beam 36 is shown in its upper or released position. Completing the solenoid circuit to energize solenoid 41 causes arm 43 to swing to the position shown in Figure 4 and in so doing it carries beam 36 to the upper position where roller 38 no longer contacts the front surface 40 of latch 24. As a result, latch 24 swings under the influence of the load at the end of beam 17 and also under the influence of spring 33 to the open position shown, which position is limited by stop pin 46. It will be noted that the upper end of latch 24 incorporates an extended surface 47 along which roller 38 moves and which holds beam 36 in its open position until latch 24 is again moved to its closed position. A torsion spring 48 urges beam 36 towards its closed position.

A "normally closed" limit switch 49 is supported on frame 20 in position so that its roller 50 is moved to switch "open position" when the beam 36 moves to its upper or released position. As soon as latch 24 has been released switch 49 is opened to break the solenoid circuit, thus protecting it from damage which might be caused by extended application of electric energy. It will be noted that as soon as latch 24 swings to "open position" the end 23 of beam 17 is released and swings to "open position" and thus allows separation from the load carried by ring 16 or any suitable connecting member.

The above described electrical release of the latch mechanism may be accomplished by completion of the electric circuit in either of two ways. The first way is by operation of the pilot control switch button and the second by closing the automatic load release switch, the circuits for which will be described later. A suitable actuating mechanism for the automatic release switch is shown in Figures 4 and 5 where it will be seen that the pivot for supporting the attached end of beam 17 takes the form of trunnions 21 attached to block member 51. The end of the beam 17 is enlarged at 52 to provide for housing block 51 within a slotted opening 53 thereby providing for endwise movement of block 51 in opening 53. Block 51 is provided with cylindrical cavity 54 in which is mounted cylinder 55 with an internal compression spring 56. Under conditions of no load on the beam spring 56 urges cylinder 55 upwardly and thus holds end 52 of beam 17 in the upper position as illustrated in Figure 4. However, when a load is applied to beam 17 it overcomes the force of spring 56 and causes the end of the beam to ride down against the top side of block 51 as indicated in Figure 3. This vertical movement of the end of beam 17 is utilized to actuate the automatic electric release of the cargo hook.

A cam member 57 is provided at the upper portion of the end 52 of beam 17 and in the loaded position shown in Figure 3 this cam just touches rod member 58, which is supported in block 59 attached to body 20. At the upper end of rod 58 a small beam 60 is pivotally mounted at 61 to body 20 and engages roller 62 of the limit switch 63. In Figure 3 the limit switch 63 is shown in its open position so that the solenoid circuit is open when the load is being carried by beam 17. When the operator moves the load into position and then lowers it so that the load weight is removed from link or ring 16 and thus from beam 17 the end 52 of the beam moves upwardly to the position shown in Figures 4 and 5 and in doing so pushes rod 58 upwardly to move beam 60 and roller 62 to cause closing of limit switch 63. Closing of switch 63 causes completion of the circuit to the solenoid which is energized and moves arm 43 to the position shown in Figure 4 causing release of latch 24 and release of the load from beam 17. Upon release beam 17 swings to open position as shown in Figure 6 where it will be seen that cam 57 swings away from rod 58 and permits it to slide to downward position under the influence of torsion spring 64 acting on beam 60. Thus as soon as beam 17 swings open limit switch 63 again moves to open position thus breaking the solenoid circuit. It will be observed that sides 28 and 30 of body 20 are provided with suitable depressions to accommodate the thickness of the limit switches 49 and 63.

In addition to the electrical operation described above, manual operation of the release hook is accomplished by applying tension to cable member 18 as will be clearly seen in Figure 6. Load to cable 18 may be applied by a suitable control lever near the operator's position thereby causing the end of lever 36 to be raised to release position. Compression spring 65 reacts between abutment 66 on the cable 18 and housing 20 to provide for return of the cable to the position shown in Figure 3 upon release of the tension. Abutment 67 is provided to limit the release position of the cable mechanism. At the lower end of cable 18 another abutment 68 is provided to contact terminal 69 of lever 36. A stop pin 70 limits the upward movement of lever 36. With this construction, as will be observed by reference to Figures 3, 4 and 6, electrical actuation causes motion of lever 36 without disturbing the position of cable 18 and conversely manual movement of lever 36 by means of cable 18 does not alter position of solenoid arm 43. It will be evident that control 18 may be any suitable connection, for example, a flexible push-pull control such as commonly used in automotive or aircraft secondary controls.

As will be seen in Figure 6 shaft 37 which serves as the pivot for lever 36 is extended through cover plate 30 and is equipped with handle 71. This handle provides a convenient means for a ground operator to open the hook manually for loading purposes and also acts as a visual indicator to show when the hook is properly closed.

Figure 8 shows a typical wiring diagram suitable for use with the release hook. Thus the battery 72 is shown connected to one side of the solenoid circuit through "normally closed" switch 49. Connections 73 and 73a provide the circuit portion between solenoid 41 and battery 72. Another wire 74 connects the battery 72 to the "arming" or safety switch 75, which may be located at any convenient point in the pilot's compartment. Connection 76 extends from "arming" switch 75 to the pilot's push button switch 77, which will normally be mounted on one of the control levers, such as the collective control lever, so that the pilot need not move his hand from the flight control to operate the release hook. Connection 78 between the pilot's button 77 and the solenoid 41 completes the pilot's control circuit. The automatic circuit includes connections 73 and 73a to battery 72, the connection 74 to switch 75, and connection 79 from loading switch 75 to automatic release switch 63. Connection 78a between automatic switch 63 and the solenoid 41 completes the circuit. In Figure 8 connector 80 is shown between the electric wiring in the hook unit 11 and wires extending to the battery and pilot controls. This connector 80 is also shown in Figures 3, 4 and 6. Cable 19 includes wires 73, 78 and 79.

Thus, when it is desired to energize the system so that release of the hook can be accomplished, it is necessary to close the safety or arming switch 75. This is normally done by the pilot prior to his final approach to the unloading point, it being desirable to retain the safety switch open during flight to prevent accidental closing of the circuit either through the pilot's switch 77 or through in advertent operation of automatic switch 63 under accelerated flight loads. With arming switch 75 closed when the pilot approaches the unloading position, he may either hover over the spot with the load just above the ground and by depressing pilot's switch 77 may then release the load to position, or he may set the load on the ground to relieve the weight from the release hook at which time switch 63 is automatically closed to complete the circuit and release the load. Depending upon the condition of the operation, the pilot will either then fly away without a load or a return load may be attached to the release by the ground operator. After the pilot has released the load he again opens safety switch 75 when under conditions where he is free to remove his hand from the control at least momentarily.

To close the hook the beam 17 is brought into the position shown in Figure 4 with the load ring 16 in position. With the upper surface of extension 23 against the extended tip 32a upward pressure is applied to beam 17 thus causing rotation of latch 24 in the closing direction. Upon reaching closed position beam 36 and roller 38 move to down or latched position as shown in Figure 3 under the influence of spring 48.

In Figures 9 and 10, a somewhat different latch control mechanism is illustrated. The load beam 17 is supported in the same general fashion as previously described with latch 24 engaging end 23 of beam 17. The upper extension 27a of latch 24 is provided with pivot 82 to which connecting part in the form of toggle links 83 are attached, the other end of links 83 being connected to latch release beam 36a by pivot 84. Release beam 36a is supported in housing 20 by shaft 37a. The outer end 85 of beam 36a is offset to clear the upper end of latch extension 27a. In the closed position of latch 24, as in Figure 9, portion 85 of beam 36a touches extension 27a to determine the limit position in which the toggle links are in a slightly over dead center position. Thus the moment on latch 24 developed by the load at the end of beam 17 is resisted by a compression force through toggle links 83 and beam 36a to shaft 37a. Spring 48a tends to hold beam 36a in closed position.

To release latch 24 beam 36a is moved to its open position as shown in Figure 10 either electrically by means of solenoid 41 or manually by control 18a. As soon as beam 36a is moved upwardly a small distance above dead center the beam 36a no longer resists movement and opening action is continued under the influence of the load applied to latch surface 26 until full open position is reached and latch extension 27a engages stop 46. In this open position toggle links 83 have assumed a generally vertical position in which there is a dead center relationship between latch pivot 25 and link pivots 82 and 84.

In this position the force of spring 33 predominates and holds the parts in "open" position ready for latching. This is done by the ground assistant moving the beam 17 to closed position when the upper surface of end 23 engages projection 32a of the latch and causes closing motion against the force of spring 33. When latch 24 approaches the "closed" position under pressure applied from upper surface of beam end 23 the toggle relationship changes so that spring 48a assumes control and causes full closing and retention of the beam 36a in locked position.

As in the mechanism of Figure 3 the link 44 and the control 18a are provided with lost motion means to allow either manual or electrical operation independently.

The form in Figures 9 and 10 includes the automatic switch 63 operated in the same manner as previously. However the second switch 49 is omitted in the simplified arrangement. It will be noted that in the open position of beam 17 (see Figures 6 and 10) the position of cam 57 is such that switch 63 has returned to "normally open" position. Thus the solenoid circuit is automatically opened after the load has been released automatically, that is, by setting the load down to remove the weight from beam 17. It is only when the pilot releases the load by switch 77 (Figure 8) that switch 49 is needed to open the circuit upon release. Since pilot switch 77 is "normally open" and need be held closed only a second or less there is little danger that closing of the circuit will be maintained for critical periods such as 15 seconds. Therefore, damage to the solenoid is remote and the switch 49 can be dispensed with except in cases where large and expensive solenoids are used when such a safety switch provides added protection. The same electrical circuit as shown in Figure 8 may be used except that switch 49 is omitted and conductors 73 and 73a are continuous.

The manner in which a sling release of this nature is used will be clear from the above description. The use of a latch member having a locking column or beam which acts in direct compression serves to simplify the release mechanism. At the same time this construction eliminates highly concentrated loads in the linkage. The use of a horizontal member to which both the manual and electrical control members can be connected permits easy attachment for individual operation without interaction. The use of a rotary type solenoid further assists in providing compact mechanism utilizing a swinging arm for electrical control. The rotary solenoid also eliminates the problem of sealing since only an opening for the shaft is needed to transfer the solenoid movement to the inside of the housing. The use of a spring enclosing trunnion block to support the load beam provides a desirable form of automatic control for the release switch. By using the sliding rod actuator with the movable trunnion block further problems of sealing the case are overcome. Likewise the arcuate construction of the latch member provides a simple solution for sealing at the point where the latch emerges from the casing. The latch linkages used provide the stable open or closed positions needed to give positive opening or closing action. These desirable features may be obtained with structure which need be held only to normal manufacturing tolerances thus resulting in an inexpensive construction.

I claim:

1. A sling release device having a frame, a load carrying beam having one end pivotally attached to said frame for movement from the open to closed positions, a latch member pivotally attached to said frame for movement from latch to open position, said latch member being near the other end of said beam and having a supporting surface for engaging the lower side of the end of said beam when said latch is closed, said latch also having a projecting part engaging the upper side of the end of said beam when said latch is open thereby providing for closing said latch under pressure applied from said beam.

2. A sling release device having a body with a back plate, a front plate and an edge wall located between said plates, a latch member having a pivot supporting it between said plates a portion of said member extending outside of said edge wall and a portion extending inside said edge wall, said latch member having two arc shaped surfaces concentric with the axis of said pivot, said edge wall extending into close proximity with said arc shaped surfaces to provide a complete enclosure for the inside of said body while permitting limited angular movement of said latch member.

3. A sling release device having a body with a back wall, a front wall and an edge member extending around substantially the complete periphery of said body to provide a weather proof enclosure, latch mechanism located inside said body including a beam member having a pivotal mounting, a rotary type solenoid mounted on the outside of one of said walls, a rotatable shaft extending from said solenoid through the wall to the interior of said body, connecting means between said shaft and said beam member to move said beam member to release position, said means including an arm attached to said shaft inside said walls.

4. A sling release device having a body, a load carrying beam pivotally supported at the lower side of said body, the pivotal support including a block member having trunnions extending therefrom into said body, a spring supported in said block member and reacting between said block member and said beam, the end of said beam being apertured to receive said block member with lost motion between said block and said beam, a rod member supported for axial movement in said body and projecting through the wall thereof adjacent the pivotal support for said beam, release mechanism for said device supported on said body, including a solenoid, a limit switch mounted on said body with an electrical connection to said solenoid, and connecting means between said limit switch and said rod member.

5. A construction in accordance with claim 4 in which a switch actuator beam contacts said rod member, and a bias spring reacts against said beam to urge it away from said limit switch.

6. A sling release device having a body, a load carrying beam having a pivotal support on said body, said pivotal support including a block member with trunnions extending therefrom, a spring mounted in said block and reacting against said beam, said block being supported in said beam to provide lost motion between the loaded and unloaded positions, release mechanism for said beam supported inside said body, connecting means engaging said pivotal support and extending into said body to actuate said release mechanism.

7. A sling release device having a body, a load carrying beam pivotally supported at one end to said body, a latch member pivotally supported in said body and supporting the other end of said beam when it is in closed position, said latch member extending into said body, a beam structure pivotally supported in the body and extending close to the end of said latch member, a roller mounted on said beam structure and reacting against the edge of said latch member when in locked position, a release element connected to said beam structure to cause movement of said structure about its pivot, movement to release position permitting said latch member to move to release position, the end of said latch member having an extended surface supporting said roller to hold said beam structure in release position until said latch member is returned to locked position.

8. A construction in accordance with claim 7 in which said latch member is biased to release position and said beam structure is biased to closed position.

9. A sling release device having a body, a load carrying beam pivotally supported at one end to said body, a latch member pivotally supported in said body in position supporting the other end of said beam when in closed position, said latch member extending into said body, a beam structure pivotally supported in the body and extending close to the inner end of said latch member, a toggle link pivotally attached to the inner end of said latch member and pivotally attached to said beam structure, said link being proportioned to be in dead center relation with said beam structure when the latch is in closed position and to be in dead center relation with said latch when the latch is in open position.

10. A construction in accordance with claim 9 in which said beam structure includes an offset portion extending past the inner end of said latch member to act as a position stop, a manual control connection located at the end of said beam structure.

11. A construction in accordance with claim 9 in which a power source is supplied for release, said beam structure being connected to said power source, the connection including a link pivotally connected to said beam structure and incorporating a slot to allow release movement of the beam structure without causing movement of the power source.

12. A sling release device having a body with front and back plates and an edge wall between them, a load carrying external beam, said body having a pair of downwardly extending legs connected to the front and back plates at a lower corner, a pivot in said legs to support one end of said beam, a latch member having a pivotal support on said body close to said edge wall, said latch member having a portion extending outside said edge wall from the pivotal support to engage the other end of said beam and also having a portion extending inwardly into said body from said pivotal support, the front and back plates being extended beyond said edge wall to protect the sides of said outwardly extending portion of said latch member in both open and latched positions, a latch control arm pivotally supported at one end in said body and engaging the inner end of said latch member near its other end, and releasing mechanism connected to said arm.

13. A sling release device having a body, a load carrying beam having a pivotal attachment to the lower portion of said body, a latch element having its mid-region pivotally supported in said body for movement therein and supporting one end of said load beam when in latched position, said latch element having a portion extending inwardly from its mid-region into said body, a control beam pivotally connected to said body and extending to a point close to said latch element, a part attached to said control beam and engaging the inwardly extending portion of said latch element near its end, said part being positioned generally on a line perpendicular to the longitudinal direction of the latch element to provide load transfer between said latch element and said control beam when in latched position, said part being positioned generally in line with the longitudinal direction of said latch element when in open position thereby retaining said control beam in open position with respect to said latch, and a control member connected to said control beam to move it on its pivot from latched to open position.

14. A construction in accordance with claim 13 in which said control member is a manually controlled cable and extends to the outside of said body, a power operated mechanism supported on said body, another control member connecting said control beam and said mechanism, each of said control members having a lost motion connection to permit movement of the control beam by one control member without causing movement of the other control member.

References Cited in the file of this patent

UNITED STATES PATENTS

| | | | |
|---|---|---|---|
| 493,276 | Louden | Mar. 14, | 1893 |
| 664,057 | Olson | Dec. 18, | 1900 |
| 690,659 | Ney | Jan. 7, | 1902 |
| 1,379,537 | Davis | May 24, | 1921 |
| 1,379,788 | Stone | May 31, | 1921 |
| 1,618,344 | Kopp | Feb. 22, | 1927 |
| 2,131,445 | Lawton | Sept. 27, | 1938 |
| 2,430,940 | Leland | Nov. 18, | 1947 |
| 2,482,516 | Sheesley | Sept. 20, | 1949 |
| 2,548,053 | Pierson et al. | Apr. 10, | 1951 |
| 2,604,353 | Pierson et al. | July 22, | 1952 |
| 2,606,052 | Soreng et al. | Aug. 5, | 1952 |
| 2,668,071 | Adams et al. | Feb. 2, | 1954 |
| 2,690,347 | Erkila | Sept. 28, | 1954 |
| 2,758,867 | Elsner | Aug. 14, | 1956 |

FOREIGN PATENTS

| | | | |
|---|---|---|---|
| 285,376 | Great Britain | May 31, | 1928 |
| 599,461 | Great Britain | Mar. 12, | 1948 |

UNITED STATES PATENT OFFICE
CERTIFICATE OF CORRECTION

Patent No. 2,904,369                September 15, 1959

Harris S. Campbell

It is hereby certified that error appears in the printed specification of the above numbered patent requiring correction and that the said Letters Patent should read as corrected below.

Column 1, line 58, for "objection" read -- object --; column 6, line 51, for "from latch" read -- from latched --.

Signed and sealed this 1st day of March 1960.

(SEAL)
Attest:

KARL H. AXLINE
Attesting Officer

ROBERT C. WATSON
Commissioner of Patents